United States Patent Office 3,535,345
Patented Oct. 20, 1970

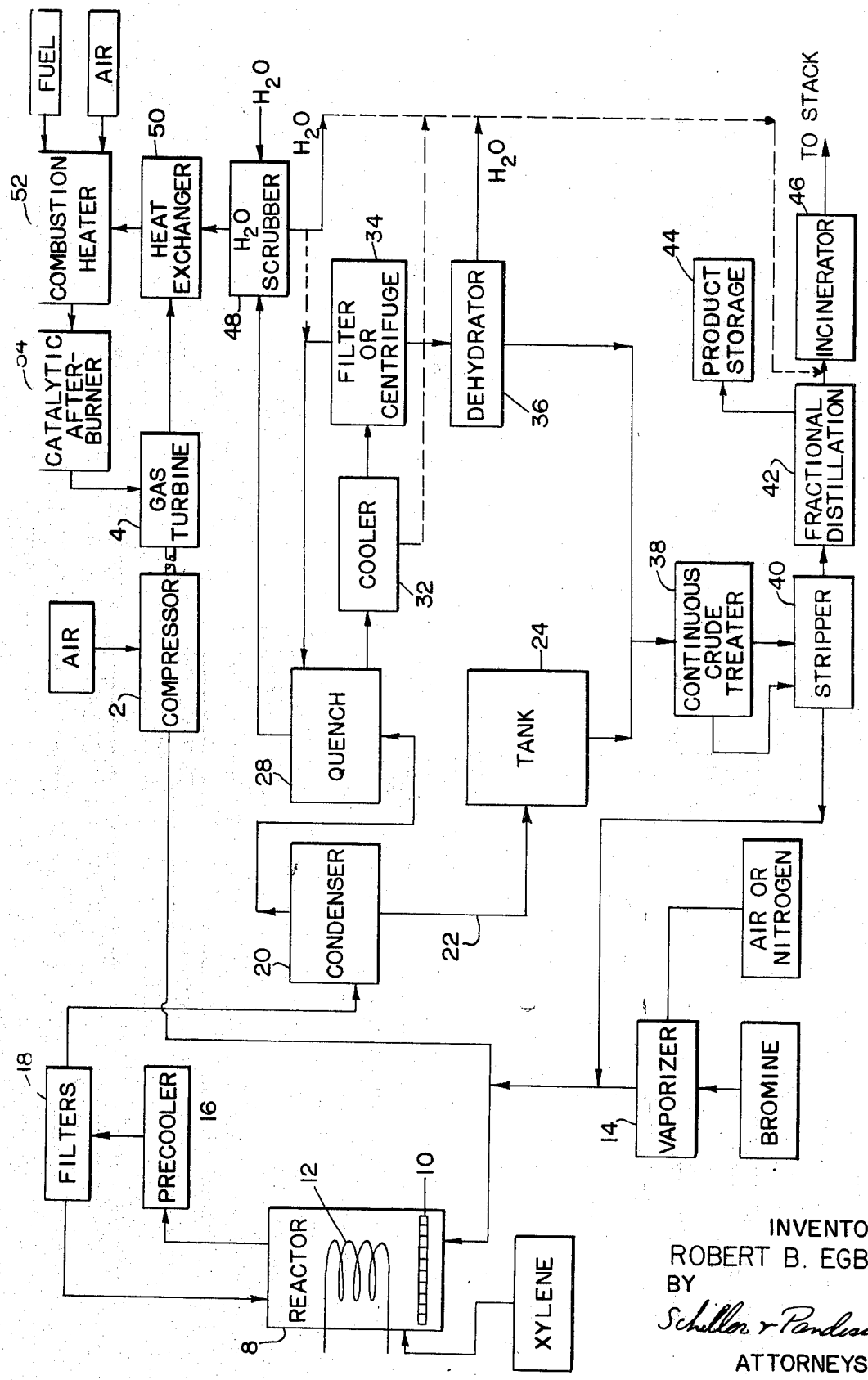

3,535,345
METHOD OF PRODUCING PHTHALIC ANHYDRIDE
Robert B. Egbert, West Stamford, Conn., assignor, by mesne assignments, to The Badger Company, Inc., Cambridge, Mass., a corporation of Delaware
Filed Aug. 15, 1967, Ser. No. 660,739
Int. Cl. C07c *63/02, 63/18*
U.S. Cl. 260—346.4                                13 Claims

ABSTRACT OF THE DISCLOSURE

A process for production of phthalic anhydride by vapor phase oxidation of o-xylene with air wherein at least 80–90% of the product is recovered from the reactor effluent in liquid condensers and the remaining product is recovered by wet process quenching and solids filtration. The reactor is operated at a relatively high pressure, at least about 60 p.s.i.g., and overall power consumption is minimized by utilizing the heat and compression energy in the hot product vent gas to compress and heat the air fed to the reactor.

---

The present invention relates to an improved process for the vapor phase catalytic oxidation of o-xylene to phthalic anhydride (hereinafter referred to as PAA) with an oxygen-containing gas, particularly air, in a fluidized catalytic bed.

Phthalic anhydride is a widely used chemical, being employed, for example, in the manufacture of alkyd and polyester resins and the synthesis of phthaleins. For a long time most commercial production of PAA was based upon and involved vapor phase oxidation of naphthalene with air. More recently a process has been developed for making PAA by the vapor phase oxidation of o-xylene with air in a fluidized catalytic bed with reactor temperatures preferably in the range of 620–700° F. and reactor effluent pressures sufficiently above atmospheric pressure for convenience in product recovery, e.g. up to about 22 p.s.i.g. The catalyst used in this process comprises vanadium oxide fluxed with a compound of $SO_3$ and an alkali metal oxide (preferably potassium oxide), all supported on a highly porous particulate silica gel support. In order to achieve adequate rates of reaction, yields and selectivity, it has been found necessary to carry out the oxidation reaction in the presence in the vapor phase of a bromine promoter in the form of elemental bromine, HBr, or a bromine compound capable of dissociation into elemental bromine or HBr at the reactor temperature. The bromine promoter is effective to selectively activate in the vapor phase the methyl groups and thereby increase the rate of selective oxidation thereof compared to the rate of oxidation of the benzene ring. This directly increases both selectivity and yield of PAA. It also permits lower reaction temperatures without formation of large amounts of undesired partial oxidation products. Lowering the reaction temperature further reduces the rate of oxidation of the ring carbons while the methyl groups oxidize at a rapid rate due to being activated by the bromine promoter.

Manufacturing PAA from o-xylene by this recently developed process offers a number of advantages over prior methods involving air oxidation of naphthalene, with the most important being the relatively low cost of o-xylene. Nevertheless present day fluid bed plants for producing PAA from o-xylene incorporate design features which obviously need substantial improvement, stemming from the fact that approximately half of the product is separated out by means of solids condensers. To recover this product it is necessary to melt it out of the condensers. Accordingly, in order for the plant to operate continuously it is necessary to provide two or more parallel trains of solids condensers, receivers and the like, with at least one train always on stream and operating while the other trains are off stream undergoing product recovery. This requirement of parallel trains of equipment complicates plant design and operation. A further opportunity for improvements in present day plants is high power cost for air compression. Typically about 40% of the operating cost is power.

The general object of this invention is to provide a fluid bed process for producing PAA by catalytic vapor phase oxidation of o-xylene that achieves the high yield and selectivities of prior o-xylene oxidation processes but at lower power costs and without having to use duplicate alternately operating trains of equipment for recovering the product from the reactor effluent.

A more specific object of this invention is to provide an improved process of producing PAA from o-xylene in which most of the product is recovered by means of continuously operating liquid condensers.

Another specific object is to provide an improved fluid bed process for producing PAA from o-xylene in which the oxidation reaction proceeds at a faster rate than is possible with existing commercial processes.

These and other objects and advantages which are mentioned in or rendered obvious by the following detailed specification are achieved by operating the reactor at a relatively high pressure, preferably in the range of 60–80 p.s.i.g., by employing operating conditions that enable most of the product to be separated from the reactor effluent as a liquid and the remainder as an aqueous slurry rather than a solid, and by recovering and employing the heat and compression energy in the hot product vent gas to minimize overall power consumption.

The marked increase in reactor pressure (60–80 p.s.i.g. as compared to a pressure of 22 p.s.i.g. for a prior process involving the same oxidation reaction) enables the reaction to proceed at a substantially increased rate. This increase in reaction rate is attributable to several factors. For one thing the greater the pressure the better the diffusion of reactants through the catalytic bed. For another thing, an increase in pressure produces an increase in gas density and a corresponding decrease in the difference in density between the reactant gases and the fluidized catalyst particles, with the result that more energy is available in the reactant gases to achieve uniform fluidization of the catalyst bed. It also makes it possible to operate the reactor at somewhat lower temperatures (the extent to which the reaction temperature may be decreased is limited by a tendency for incomplete oxidation as the temperature is lowered). In this connection it is to be noted that the largest operating cost of a plant designed to convert o-xylene to PAA is power and the greatest factor in this cost is the amount of power consumed in operating the fluid bed reactor. In the present invention this factor is materially decreased by utilizing the heat and compression energy in the hot product vent gas to compress and heat the air feed for the reactor. The problems inherent in separating the PAA as a solid by passing the reactor effluent through a battery of solids condensers are obviated by passing the reactor effluent through a liquid condenser under operating conditions that permit about 80 to 90% of the product to condense therein as a liquid. The remaining product in the uncondensed gas is recovered by wet process quenching and solids filtration. Thereafter, the recovered product is treated according to conventional techniques to effect removal of water and impurities.

Further material aspects of the invention are presented by the following detailed description of a preferred embodiment of the invention which is to be considered together with FIG. 1. The latter is a diagrammatic drawing of apparatus for carrying out the method of the present invention and also is effective as a flow sheet to show the flow of materials.

Referring now to FIG. 1, air is compressed to a pressure of 70-90 p.s.i.g. by means of a centrifugal or axial flow compressor 2 that is mechanically coupled to and driven by a suitable source of motive power such as a gas turbine 4. This compressed air may be preheated to a temperature of about 400° F. by passing it through a heater. It is introduced into the bottom of a reactor 8 containing a bed of catalyst (not shown) having a height of 22 feet and a diameter of 5¼ feet. The air passes into the catalyst bed through a grid 10 located at the bottom of the bed. A plurality of cooling coils 12 are immersed in the bed which is fluidized by the air stream. In this preferred embodiment the equilibrium catalyst (the catalyst after it has reached equilibrium conditions) has the following composition by weight:

|  | Percent |
| --- | --- |
| $SiO_2$ | 73.4 |
| $V_2O_5$ | 4.0 |
| $K_2O$ | 8.3 |
| $SO_3$ | 13.8 |
| Impurities | 0.5 |

The $SiO_2$ support is a highly porous silica gel having a bulk density of 0.43 gram per cubic centimeter, a surface area of 650 square meters per gram, a pore volume of 0.88 cubic centimeter per gram, and a calculated pore diameter of 55 A.

A promoter in the form of bromine is added to the air stream via a vaporizer 14 at a rate equivalent to about 0.02 percent by weight of the compressed and heated air stream. Ortho-xylene of commercial purity is sprayed as a liquid into the mass of boiling catalyst at one or more points above the grid plate 10. The xylene is fed at a rate to maintain the weight ratio of air to xylene within the limits of 9:1 and 13:1. The heat of reaction is removed by generating steam in the coiling coils 12. The heat of reaction is removed at a rate such that the temperature in the reactor is maintained at about 660° F.

The gaseous reaction effluent is withdrawn from the top of the reactor at a rate such that the pressure at the top of the reactor is about 60-80 p.s.i.g. The effluent is then cooled to about 510° F. by passing it through a precooler 16 which is cooled by air. After precooling, the gaseous effluent passes through three or more filters 18 to effect removal of entrained catalyst. The separated catalyst is recirculated by air back to the reactor. The filtered effluent then passes downward through a liquid condenser 20 of conventional construction. Cooling tubes (not shown) in condenser 20 serve to cool the gaseous effluent to a temperature of about 270° F. and at this temperature about 90% of the product phthalic anhydride in the reactor effluent condenses out as a liquid. This liquid is withdrawn through a heated line 22 into a pressure tank 24 which is heated to maintain the phthalic anhydride at a temperature of about 290° F.

The uncondensed portion of the gaseous reactor effluent is removed from liquid condenser 20 at a pressure of about 65 p.s.i.g. and is introduced into a quench vessel 28. The quench vessel 28 is fed with cold aqueous process solution recycled back from other equipment as hereinafter described. The uncondensed portion of the reactor effluent is scrubbed with the cold aqueous process solution in quench vessel 28. It is essential that cooling of the uncondensed reaction gases take place by direct contact with the cold aqueous process solution and not by indirect heat exchange through the walls of the pipe by which the gases are delivered to the quench vessel. Accordingly the pipe which delivers the uncondensed portion of the reactor effluent to the quench vessel is insulated externally so as to prevent it from reaching a temperature at which solid phthalic anhydride will collect and plug its exit end. The temperature of the aqueous process solution in the quench vessel is maintained at a temperature of about 150 to 170° F., as a result of which substantially all of the PAA remaining in the uncondensed gases (about 10%) will condense in the cold aqueous process solution (along with some impurities) to form a slurry. The slurry is passed through an evaporative cooler 32 and then to the solids recovery equipment. A mixture of phthalic anhydride and phthalic acid is continuously separated from the cooled slurry by passing the latter through a filter or centrifuge unit 34. The phthalic anhydride-phthalic acid mixture recovered from the slurry is passed to a dehydrater unit 36 where it is heated sufficiently to convert the phthalic acid to PAA and water vapor. The crude liquid PAA from the dehydrater unit and the crude PAA extracted in tank 24 are combined and passed to a continuous crude treater 38 adapted to strip out impurities such as water, HBr, maleic anhydride and other volatile and by-products. These flow to the vapor outlet of a liquid product stripper 40. The partially purified product is then passed through the refluxed, reboiled liquid stripper 40 where remaining traces of HBr and water are removed in vapor form and sent back to reactor 8 with the partially cooled vapor stream from treater 38. The PAA from stripper 40 is delivered to a fractional distillation unit 42 where it is distilled to specifications. The finished product is then passed to a storage tank 44. The gaseous and liquid impurities removed in the distillation unit 42, plus waste streams from the dehydrator 36, the cooler 34 and the water scrubber 48, may be passed to an incinerator 46 where they are burned with air and passed to a stack for exhaust to the atmosphere.

The uncondensed gaseous effluent percolates out of the quench vessel 28 and, still under pressure, is delivered to a scrubber 48 where it is scrubbed with water. The water from the scrubber may be discarded or may be added as required for makeup to the filtrate that is recycled to quench vessel 28. The scrubbed gases leave scrubber 48 still under pressure and are directed to a heat exchanger 50 where they are reheated with exhaust gas from turbine unit 4. Any remaining sensible heat in the exhaust gas may be recovered by way of preheating the compressed air feed. The scrubbed vent gases leave heat exchanger 50 at a temperature of 400 to 600° F. This is insufficient for the purpose of driving turbine 4, and therefore, they are subjected to further heating. This may be done indirectly in a suitable furnace. Preferably, however, it is accomplished by direct contact with fuel gas being burned in a combustion heater 52. The gases are heated to a temperature of about 1200° F. in heater 52, sufficient to oxidize organic vapors to combustion products. The mixture of vent gases and flue gas is passed out of heater 52 to a catalytic afterburner 54 where carbon monoxide and any traces of unburned fuel are oxidized. The hot gases leave the afterburner at a temperature of about 1350° F. and a pressure of about 55 p.s.i.g. and pass through turbine unit 4 where they are expanded to essentially atmospheric pressure. The work recovered by expansion of the heated process vent gas in the turbine unit must supply the energy necessary to compress the air delivered to reactor 8. This is accomplished by proper selection of the pressure and temperature of the turbine inlet stream.

It is to be appreciated that the foregoing description pertains to a preferred set of operating conditions for carrying out the process of the present invention, and that the operating conditions may be varied within limitations without adversely affecting the yield and selectivity of oxidation. In practice it has been determined that the bromine promoter may vary from about 0.1 to about 5%, preferably 0.1 to 2%, based on the weight of o-xylene. While bromine and HBr are the preferred promoters, satisfactory operation also may be achieved using other bromine compounds capable of dissociating into elemental bromine or HBr at reactor conditions.

The ratio of air to o-xylene may range from as low as about 7.5 to 1 to as high as about 20:1; however, preferably it is between about 9:1 and 13:1 as mentioned above. The ability to operate efficiently with air-to-feed ratios in the neighborhood of 10 to 1 is believed to be a novel feature of this invention since prior processes generally require much higher ratios, e.g. 20 to 1.

While the air feed preferably is introduced to the reactor at a pressure of about 70–90 p.s.i.g. and the reactor is preferably maintained at a pressure of 60–80 p.s.i.g., somewhat lower pressures also may be used without materially decreasing the effectiveness of the liquid product condensing equipment. In connection with operating pressures, it is to be noted that the amount of PAA in the gas fraction that is delivered to the quench vessel at nearly a constant temperature slightly above the freezing point of PAA is a function of the phthalic anhydride partial pressure in this gas. The amount of PAA is also affected by the ratio of air to o-xylene and the operating pressure of the system. The amount of product remaining in the gas fraction has less value with increasing reactor pressure and at some pressures above 90 p.s.i.g. the amount of product in the gas fraction may be so small as not to justify recovery of the product by water quenching. Higher pressures are possible and offer the advantage of further gains in the amount of power recovered and recycled back to the system. However, as a practical consideration, the increase in cost for equipment designed to handle higher pressures may equal or even exceed the savings achieved by recovering more power.

The operating temperatures also may vary. Overall broad limits for the reactor temperature are about 500° F. as a minimum and about 755° F. as a maximum. A preferred range is about 620° F. to about 660° F. It also is preferred that the temperature of the reactor effluent be in the range of 450–520° F. as it leaves precooler 16, and about 265–275° F. as it leaves condenser 20. The solution in the quench tank also may be greater or less than 170° F., preferably within the range of 150–180° F.

It is to be noted also that the recovery of heat energy from the product vent gas in some cases may be achieved without having to pass the vent gas through the catalytic afterburner 54, provided the gas is free of objectionable impurities and has sufficient temperature and pressure to run the turbine unit 4 at the required compressor load.

As a general consideration it is preferred that in a full scale plant the reactor vessel have a fluid bed with a height of 20–60 feet and a diameter in the range of 4 to 30 feet. For optimum performance the fluid velocity through the reactor should be in the order of ½ to 2 feet, per second.

The essence of the function of the quench vessel is countercurrent contact between the aqueous process solution and the uncondensed reactor effluent delivered from the liquid condenser 20. This countercurrent action provides the desired degree of agitation so that the product will not settle at the bottom of the quench vessel but will be carried out in slurry form to the filter unit 32. It is to be noted that the quench vessel need not be designed to withstand pressures higher than the maximum air pressure provided, and that its use avoids the problems attendant to solids condensers. However, it is to be appreciated that the quench system could be replaced by appropriately designed solids condenser of relatively small size, thereby having the option of wet or dry product recovery. The product separated out from the gas stream in the quench vessel is mostly PAA, but some acid occurs due to slow hydration. However, the phthalic acid concentration tends to build up by recycling the filtrate. This build up of acid is overcome by dehydrater unit 36 where the acid is converted back to PAA.

One of the materials delivered to the incinerator from the fractional distillation unit is essentially a pitch. The present invention allows the option of discarding the pitch according to present practices or of burning it in the incinerator 46.

The heat recovery system, and in this context the heat recovery system includes the combustion heater 52, offers two important advantages. The first and most important is heat conservation, with the heat recovered from the uncondensed gases being recirculated to perform useful work and thereby lower the power cost. The second advantage of the heat recovery system is the elimination of noxious gases. In existing systems the gaseous byproducts are usually vented to the atmosphere with attendant problems of air pollution. In the present system the noxious gases are reprocessed and what is vented to the atmosphere is essentially a flue gas free of noxious constituents.

I claim:

1. A method of recovering phthalic anhydride from a hot products gas, said method comprising condensing phthalic anhydride as liquid from said hot product gas and thereafter quenching the uncondensed portion of said hot product gas at a temperature above the melting point of said phthalic anhydride by direct contact thereof with a cold aqueous quenching liquid to thereby reduce the temperature of said uncondensed portion of said hot product gas to a temperature below said melting point to thereby solidify and remove substantially the remaining phthalic anhydride from said uncondensed portion, and recovering the phthalic anhydride from said quenching liquid by removing water therefrom, the temperature of said uncondensed portion of said hot product gas being maintained above said melting point until it is contacted with said quenching liquid.

2. A method according to claim 1, wherein said phthalic anhydride is removed from said quenching liquid by mechanically removing water therefrom followed by dehydration.

3. A method according to claim 1, wherein water removed from said quenching liquid to recover phthalic anhydride and containing phthalic anhydride and phthalic acid is used as said aqueous quenching liquid.

4. A method according to claim 1, said hot product gas being contacted with said aqueous quenching liquid by countercurrent flow of said liquid and hot product gas.

5. A method according to claim 1, wherein said hot product gas is produced by the vapor phase oxidation with air of an aromatic hydrocarbon at a ratio of air to hydrocarbon between 7:1 and 13:1 and under a pressure of at least 60 p.s.i.g., and wherein said phthalic anhydride liquid condensation step is carried out at a superatmospheric pressure and temperature at which at least 80% of the phthalic anhydride in said hot product gas is condensed out as a liquid.

6. A method for the vapor phase oxidation of o-xylene to phathalic anhydride comprising reacting o-xylene with an oxygen-containing gas in a reaction zone to form phthalic anhydride, the pressure in said reaction zone being at least 60 pounds per square inch during the reaction, withdrawing the phthalic anhydride-containing gaseous effluent from the reaction zone and passing it under pressure to a condensation zone maintained at a temperature at which a substantial portion of the phthalic anhydride in said effluent condenses as a liquid, separating said liquid from the uncondensed portion of said gaseous effluent at a temperature above the melting point of said phthalic anhydride, quenching the uncondensed portion of said gaseous effluent, while still at a temperature above the melting point of phthalic anhydride, in water to hereby reduce the temperature of said uncondensed portion to a temperature below the melting point of phthalic anhydride to thereby solidify and form an aqueous slurry of the remaining phthalic anhydride, treating said slurry to recover a liquid concentrate of phthalic anhydride, and treating said liquid concentrate and said condensed liquid from said condensation zone to obtain purified phthalic anhydride.

7. A method according to claim 6 wherein said slurry comprises a mixture of phthalic acid and phthalic anhydride, and further wherein said liquid concentrate is achieved by separating said mixture from the aqueous portion of said slurry and dehydrating said mixture to convert substantially all of said phthalic acid to phthalic anhydride.

8. A method according to claim 6 wherein said oxygen-containing gas is air, and further wherein said air is delivered to said reaction zone at a pressrue of at least about 70 p.s.i.

9. A method according to claim 6 wherein said oxyen-containing gas is air and further wherein air and o-xylene are supplied to said reaction zone in a weight ratio in the range of about 9 to 1 to about 13 to 1.

10. A method for the vapor phase catalytic oxidation of o-xylene to phthalic anhydride comprising reacting o-xylene with an oxygen-containing gas in a reaction zone with an air to o-xylene ratio between 7:1 and 13:1 to form phthalic anhydride, maintaining the pressure and temperature within said reaction zone in the range of 60–80 p.s.i. and 500–755° F. during the reaction, withdrawing the phthalic anhydride-containing effluent from the reaction zone, passing said effluent under pressure to a condensation zone maintained at a temperature at which at least 80% of the reaction product in said effluent condenses to a liquid, separating and recovering said liquid, removing the uncondensed effluent from said condensation zone at a temperature above the melting point of said phthalic anhydride and quenching it, while it is still at a temperature above the melting point of phthalic anhydride, in a water stream to reduce the temperature thereof to a temperature below the melting point of phthalic anhydride to thereby solidify, and form a water slurry of, substantially the remaining phthalic anhydride in said effluent, separating said slurry from the remaining effluent, and treating said liquid from said condensation zone and said slurry to obtain purified phthalic anhydride.

11. A method according to claim 10 wherein said condensation zone is maintained at a temperature of approximately 265–275° F.

12. A method according to claim 10 wherein said oxygen-containing gas is air, and further wherein said air is delivered to said reaction zone at a pressure of approximately 70–90 p.s.i.

13. A method according to claim 12 wherein air and o-xylene are fed to said reaction zone in a weight ratio of from about 9 to 1 to about 13 to 1.

References Cited

UNITED STATES PATENTS

| | | | |
|---|---|---|---|
| 2,247,910 | 7/1941 | Douglass et al. | 260—346.4 |
| 3,232,955 | 10/1965 | Nonnenmacher et al. | 260—246.4 |

ALEX MAZEL, Primary Examiner

B. I. DENTZ, Assistant Examiner

U.S. Cl. X.R.

260—346.7